United States Patent
Webster et al.

(10) Patent No.: US 8,363,986 B2
(45) Date of Patent: Jan. 29, 2013

(54) DOPANT PROFILE CONTROL FOR HIGH SPEED SILICON-BASED OPTICAL MODULATORS

(76) Inventors: Mark Webster, Bethlehem, PA (US); Vipulkumar Patel, Breinigsville, PA (US); Prakash Gothoskar, Allentown, PA (US); David Piede, Allentown, PA (US)

( * ) Notice: Subject to any disclaimer, the term of this patent is extended or adjusted under 35 U.S.C. 154(b) by 156 days.

(21) Appl. No.: 13/029,342

(22) Filed: Feb. 17, 2011

(65) Prior Publication Data

US 2011/0222812 A1 Sep. 15, 2011

Related U.S. Application Data

(60) Provisional application No. 61/312,350, filed on Mar. 10, 2010.

(51) Int. Cl.
*G02F 1/035* (2006.01)
*G02F 1/01* (2006.01)
*G02B 6/26* (2006.01)
*G02B 6/42* (2006.01)

(52) U.S. Cl. ........................ 385/2; 385/1; 385/3; 385/40

(58) Field of Classification Search .................. 385/1–3, 385/40
See application file for complete search history.

(56) References Cited

U.S. PATENT DOCUMENTS

| | | | |
|---|---|---|---|
| 5,543,957 A | 8/1996 | Koui et al. | |
| 6,845,198 B2 * | 1/2005 | Montgomery et al. | 385/50 |
| 6,954,558 B2 | 10/2005 | Liu | |
| 7,035,487 B2 | 4/2006 | Samara-Rubio et al. | |
| 7,127,129 B2 | 10/2006 | Liu | |
| 7,657,130 B2 * | 2/2010 | Shastri et al. | 385/2 |
| 2009/0103850 A1 | 4/2009 | Shastri et al. | |
| 2011/0222812 A1* | 9/2011 | Webster et al. | 385/1 |

FOREIGN PATENT DOCUMENTS

JP 02-250027 10/1990

* cited by examiner

*Primary Examiner* — Rhonda Peace

(57) ABSTRACT

A high speed silicon-based optical modulator with control of the dopant profiles in the body and gate regions of the device reduces the series resistance of the structure without incurring substantial optical power loss. That is, the use of increased dopant values in areas beyond the active region will allow for the series resistance to be reduced (and thus increase the modulating speed of the device) without incurring too large a penalty in signal loss. The dopant profiles within the gate and body regions are tailored to exhibit an intermediate value between the high dopant concentration in the contact areas and the low dopant concentration in the carrier integration window area.

11 Claims, 3 Drawing Sheets

DOPANT PROFILE CONTROL FOR HIGH SPEED SILICON-BASED OPTICAL MODULATORS

CROSS-REFERENCE TO RELATED APPLICATIONS

This application claims the benefit of U.S. Provisional Application No. 61/312,350, filed Mar. 10, 2010 and herein incorporated by reference.

TECHNICAL FIELD

The present invention relates to a high speed silicon-based optical modulator and, more particularly, to a high speed silicon-based optical modulator with control of the dopant profiles in the body and gate regions of the device to reduce the series resistance without incurring substantial optical power loss.

BACKGROUND OF THE INVENTION

For decades, optical modulators were formed of lithium niobate or another optically active compound. The size and power requirements of these devices, as well as their inability to be integrated with common electronic circuits, ultimately limited their usefulness. A significant advance in the art occurred several years ago with the advent of silicon-based optical modulators. An exemplary silicon-based modulator is disclosed in U.S. Pat. No. 6,845,198 issued to R. K. Montgomery et al. on Jan. 18, 2005 and assigned to the assignee of this application. The Montgomery et al. modulator permits relatively high speed operation (in excess of 10 Gb/s) by virtue of its "overlapped", cantilevered configuration of a doped polysilicon layer and a doped SOI layer, with a thin dielectric disposed in the overlap region. Referred to as a "SISCAP" (silicon-insulator-silicon capacitance) modulator, the overlapped configuration results in the carrier integration window essentially overlapping the optical mode, allowing for efficient modulation based upon carrier movement across the dielectric layer.

FIG. 1 is a simplified concept illustration of the Montgomery et al. SISCAP modulator (also referred to hereinafter as an SOI-based modulator). In this case, SOI-based optical modulator 1 comprises a doped silicon layer 2 (typically, polysilicon and referred to at times hereafter as the "gate" layer) disposed in an overlapped arrangement with an oppositely-doped portion of a sub-micron thick silicon surface layer 3 (often referred to in the art as an SOI layer, or the "body" layer of the modulator structure). SOI layer 3 is shown as the surface layer of a conventional SOI structure, which further includes a silicon substrate 4 and buried oxide layer 5. Importantly, a relatively thin dielectric layer 6 (such as, for example, silicon dioxide, silicon nitride or the like) is disposed within the overlapped region between SOI layer 3 and doped silicon layer 2. The overlapped area defined by silicon layer 2, dielectric 6 and SOI layer 3 defines the 'active region' of optical modulator 1. Free carriers will accumulate and deplete on either side of dielectric 6 as a function of the voltages applied to SOI layer 3 ($V_3$) and/or doped silicon layer 2 ($V_2$). The modulation of the free carrier concentration results in changing the effective refractive index in the active region, thus introducing phase modulation of an optical signal propagating along a waveguide defined by the active region (the optical signal propagating along the y-axis, in the direction perpendicular to the paper).

In a preferred embodiment of this modulator arrangement, the contacts to layers 2 and 3 are spaced from the active region of the modulator, as shown in FIG. 1. A first contact region 7 (such as a silicide region) is disposed over an outer portion of layer 2, and a second contact region 8 is similarly disposed over an outer portion of layer 3.

It has been found that an improvement in performance is achieved if the region of the layers immediately adjacent to the contacts is more heavily doped than the central regions supporting the optical mode. The heavily-doped contact areas provide a very low resistance coupling to the contact regions. FIG. 2 illustrates this particular embodiment, showing a high dopant concentration area N+ within doped gate layer 2 in association with contact region 7 and a high dopant concentration area P+ within doped body layer 3 in association with contact region 8.

The speed of this prior art SISCAP modulator is determined by the equivalent resistance (R) and capacitance (C) between contact regions 7 and 8. FIG. 3 is a typical C-V curve for the device shown in FIG. 2. Obviously, for high speed applications with a fixed capacitance C (defined by the properties of dielectric 6), it is desirable to have as low a resistance value as possible, effectuated by placing the device contacts close to the active region. While providing an increase in operating speed, however, a relatively low resistance as achieved in this fashion will increase the optical loss by having the high optical absorption contact regions very close to the optical mode of the active region. FIG. 4, which is a depiction of a relevant portion of the prior art SISCAP modulator, illustrates this problem, where a significant portion of the optical intensity is shown to reside beyond the boundary of the active region. Indeed, the optical intensity approaches the location of the heavily-doped portions of gate layer 2 and body layer 3.

Thus, a need remains for increasing the speed of the silicon-based optical modulator as shown in FIGS. 1 and 2 without introducing an unacceptable increase in optical loss, as shown in the device of FIG. 4.

SUMMARY OF THE INVENTION

The needs remaining in the prior art are addressed by the present invention, which relates to a high speed silicon-based optical modulator and, more particularly, to a high speed silicon-based optical modulator with control of the dopant profiles in the body and layers of the device to reduce the series resistance without incurring substantial optical power loss.

In accordance with the present invention, the portions of the gate and body layers between the high-doped contact area and the lightly-doped active area are formed to exhibit a dopant concentration level between that of the contact area and active area. It is also possible to modify the dopant profile in only one of the layers (i.e., in only the gate layer or only the body layer).

In one embodiment of the present invention, the dopant profiles are modified in the horizontal "wing" portions of each layer. These wing portions may be uniformly doped at an intermediate value between the active region and the contact region. Alternatively, a wing portion may be formed to exhibit a graded dopant profile, decreasing in dopant concentration from the contact area to the active region. The graded profile allows for the implant dose to be higher in the area where the optical intensity is lower, and then decrease as the optical intensity becomes stronger (i.e., approaches the active region). Generally speaking, the dopant profile may track the inverse of the optical intensity profile along the wing portion of the layer.

In another embodiment of the present invention, the dopant profiles are modified in the vertical portions of the gate and body layers outside the active region of the SISCAP modulator. Again, these regions may be doped to a uniform intermediate value, or doped in a graded manner, with the highest dopant concentration being at the area furthest from the center of the active region (with the lower optical signal intensity). Indeed, in one embodiment, the dopant profile may be configured to be the inverse of the optical intensity profile evaluated in the vertical direction at the center of the active region.

In yet another embodiment of the present invention, a combination of these two different modifications of the dopant profiles may be used in combination, specifically tailoring the dopant profiles of the gate and body layers to best adjust the balance between high speed operation and optical signal confinement.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As will be discussed in detail below, a key in increasing the bandwidth of the SISCAP optical modulator is the ability to reduce the series resistance of the device while not increasing the optical loss to unacceptable levels. This goal is achieved in accordance with the present invention by modifying the implant dose in the intermediate portions of the gate and body layers between the active region (where modulation and propagation of the optical signal occurs) and the contact regions.

Figure 1:
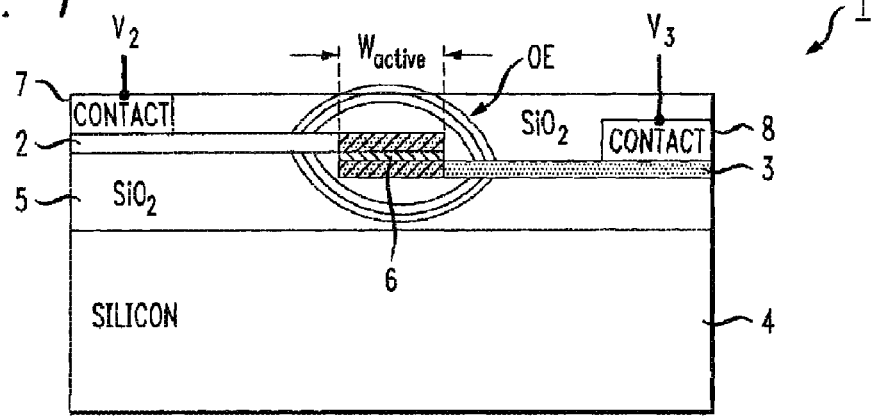
FIG. 1 illustrates a prior art silicon-based optical modulator utilizing an overlapped body and gate structure to define the area of optical confinement.
Figure 2:
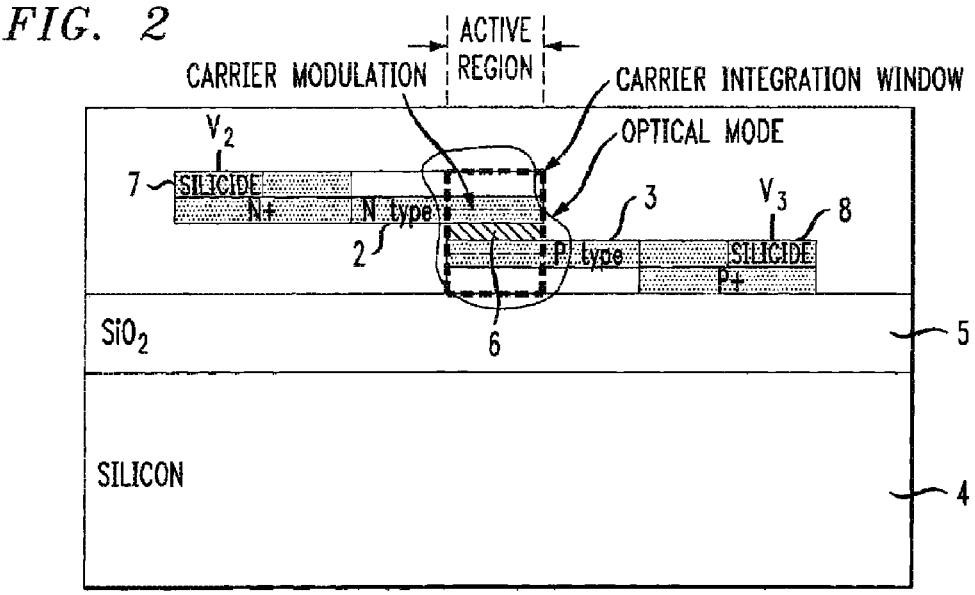
FIG. 2 is an illustration of a portion of the arrangement of FIG. 1, including heavier-doped contact portions in the body and gate layers.
Figure 3:
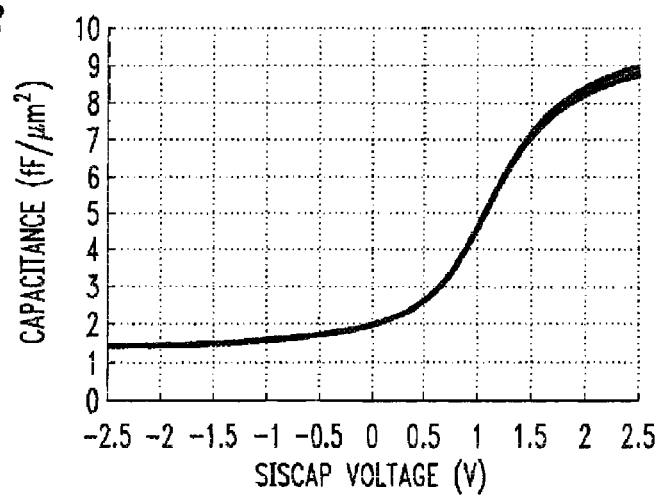
FIG. 3 is a C-V curve associated with the structure of FIG. 2.
Figure 4:
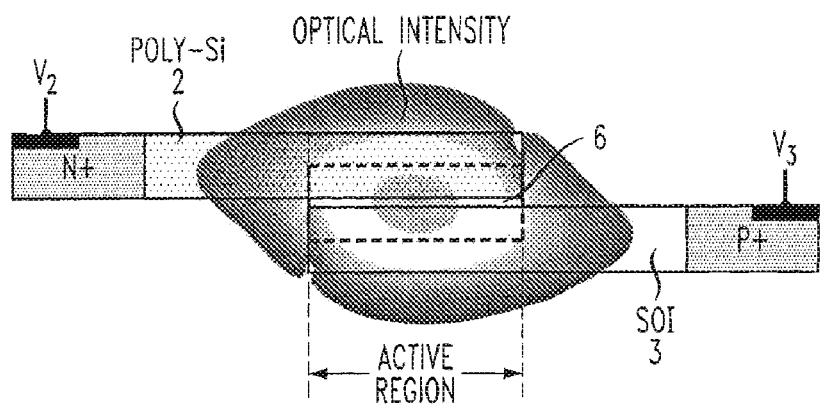
FIG. 4 is a particular illustration of the arrangement of FIG. 2, showing the spread of the optical intensity outside of the active region of the modulator.
Figure 5:
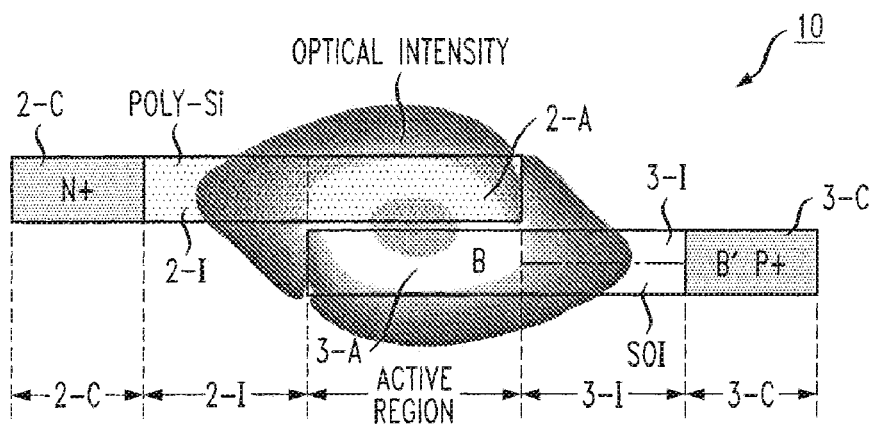
FIG. 5 shows a first embodiment of the present invention, including intermediate regions (in the horizontal direction) of the body and gate layers formed to exhibit a dopant concentration between that of the associated contact and active regions.
Figure 6:
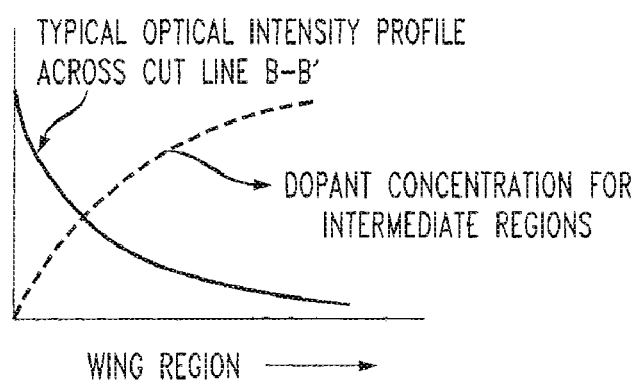
FIG. 6 contains a graph of the optical intensity across the "intermediate" portion of a prior art device, as well as a plot of an exemplary dopant profile that may be used in accordance with the present invention that is inversely related to this optical intensity.

FIG. 5 illustrates a portion of a SISCAP optical modulator 10 formed in accordance with the present invention to include a modified dopant profile. For the purposes of illustration, gate layer 2 is defined as including an outer-most contact portion 2-C and an active region 2-A in the center of the device (i.e., the active region), where carrier modulation occurs. Between these two regions, is an "intermediate" portion 2-I which, in the prior art, was uniformly doped with the active region and resulted in adding to the series resistance of the device and impacting its performance at high speeds. FIG. 6 illustrates a typical optical intensity profile of a prior art arrangement.

In accordance with the present invention, intermediate gate region 2-I is fabricated to have a dopant concentration less than the dopant concentration of contact region 2-C, but greater than the dopant concentration in active region 2-A. In one exemplary embodiment, 2-C has a dopant concentration on the order of $10^{19}$ cm$^{-3}$ and 2-A has a dopant concentration on the order of $10^{17}$ cm$^{-3}$, where the concentration of region 2-I then falls between these values. In a similar fashion, body layer 3 of modulator 10 is defined as having three regions: active region 3-A, intermediate region 3-I and contact region 3-C. Again, in accordance with the present invention, intermediate region 3-I is formed to exhibit a dopant concentration between the values of regions 3-C and 3-A. This increase in dopant concentrations in intermediate regions 2-I and 3-I will lower the series resistance of modulator 10 and allow it to operate at higher speeds than the prior art configurations.

It is to be noted that the modified dopant concentrations should not exceed the highly-doped regions used for contact, since the presence of a high dopant concentration would lead to increased optical absorption (hence, optical loss). The amount of optical loss is related to the overlap integral of the optical modal field with the dopant concentration. Therefore, where the optical field is weak, an increase in dopant concentration has little impact on the overall optical loss, allowing for the resistance to be decreased without significantly impacting the strength of the propagating optical signal. Conversely, where the optical field is larger (such as in the active region), it remains desirable to keep the dopant concentration to a minimum to avoid absorption and thus minimize loss.

There are many variations that may be employed in developing the dopant profiles for intermediate regions 2-I and 3-I. In a simple fabrication process, each portion may be uniformly doped at a suitable level between the values of the contact and active regions. Alternatively, a "graded" dopant profile may be utilized, the greater dopant concentration being at the interface with the associated contact region and then decreasing in value until reaching the interface with the action region. Preferably, the dopant concentration is the greatest in the area where the optical intensity is the lowest (i.e., next to the contact region) and then decreases as the optical intensity within the region becomes stronger. Indeed, it is possible to utilize a dopant profile that is inversely related to the optical intensity profile shown in FIG. 6. The use of a graded dopant profile is considered to be preferred alternative in terms of a trade-off between reducing the series resistance and maintaining a sufficient optical signal confinement in the active region.

Thus, in accordance with the present invention, by increasing the dopant concentration in these intermediate regions, the series resistance of the SISCAP modulator structure is reduced, allowing for the operating speed to be increased without incurring significant signal loss.

Figure 7:
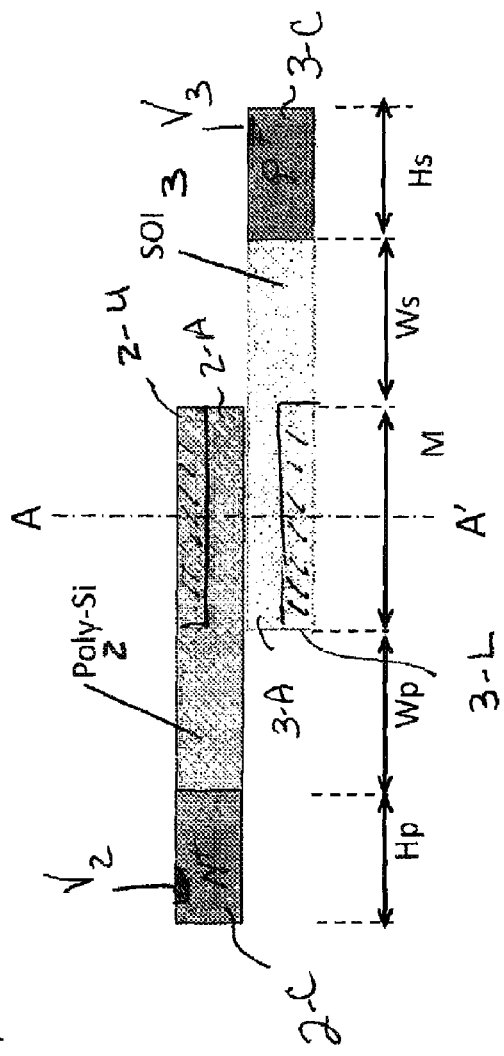
FIG. 7 shows a second embodiment of the present invention, utilizing modified dopant concentrations in the vertical direction above and below the active region to maintain optical confinement to the active region while also lowering the series resistance of the optical modulator.

An alternative embodiment of the present invention is illustrated in FIG. 7, where in this case a portion of gate layer 2 above the active region (shown as "upper" region 2-U in FIG. 7) and a portion of body layer 3 below the active region (shows as "lower" region 3-L in FIG. 7) are similarly doped at an intermediate concentration level between that of the contact regions and the active regions. In the prior art, these region would be "lightly doped" in a manner similar to the active region, where these "upper" and "lower" regions of lightly-doped silicon impact the series resistance of the prior art modulating device. In contrast, by also modifying the dopant concentration in these areas to be greater than the concentration in the active region (while remaining less than that of the contact areas), the series resistance of the SISCAP modulator will be reduced and the operating speed increased.

Figure 8:
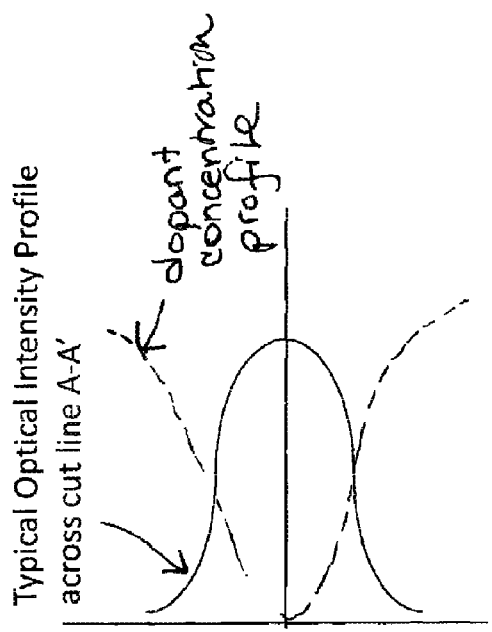
FIG. 8 contains a graph of the optical intensity in the "vertical" direction through the center of a prior art modulating device, as well as a plot of an exemplary dopant profile that may be used in accordance with the present invention that is inversely related to this optical intensity.

Again, upper region 2-U and lower region 3-L may be uniformly doped at an intermediate level, or may exhibit a graded dopant concentration. Indeed, similar to the above-described embodiment, the "vertical" dopant profile of the embodiment of FIG. 7 may be essentially the inverse of the optical intensity profile shown in FIG. 8, which is a "vertical" optical intensity profile, taken along line A-A' of FIG. 7.

It is to be understood that both "horizontal" and "vertical" modifications in the dopant profiles of gate layer 2 and body layer 3 may be utilized to best tailor the degree of optical confinement that can be achieved, while lowering the resistance in both of these "horizontal" and "vertical" areas. Indeed, it is possible to modify the dopant profile in only one region of either the gate or body layer "outside" of the active region and see an improvement in operating speed over the prior art. Various combinations of the dopant modifications, profile indexes, and the like are considered to fall within the spirit and scope of the present invention as defined by the claims appended hereto.

What is claimed is:

1. A silicon-based optical modulating device comprising:
   a silicon body layer doped to exhibit a first conductivity type;
   a silicon gate layer doped to exhibit a second conductivity type, the silicon gate layer disposed at least in part to overlap the silicon body layer to define a contiguous area between said silicon body and gate layers;
   a relatively thin dielectric layer disposed in the contiguous area between said silicon body and gate layers, the combination of said silicon body and gate layers with the interposed relatively thin dielectric layer defining the active region of the optical modulating device;
   a first electrical contact coupled to an outer, contact portion of the silicon gate layer; and
   a second electrical contact coupled to an outer, contact portion of the silicon body layer, wherein upon application of an electrical signal to the first and second electrical contacts, free carriers accumulate, deplete or invert within the contiguous areas of silicon body and gate layers on both sides of the relatively thin dielectric layer, such that the optical electric field of said optical signal substantially overlaps with the free carrier concentration modulation area in the active region of said optical modulating device, where the silicon body and gate layers are doped to exhibit a lowest dopant concentration in the active region and a highest dopant concentration in the respective outer portions, with at least one of the silicon body and gate layers further exhibiting an intermediate dopant concentration in an intermediate region between the respective active region and the contact portions.

2. A silicon-based optical modulating device as defined in claim 1 wherein the intermediate region of the silicon body layer comprises an essentially uniform dopant concentration, the essentially uniform dopant concentration being less than the dopant concentration in the contact portion of the silicon body layer and greater than the dopant concentration in the active region of the optical modulating device.

3. A silicon-based optical modulating device as defined in claim 1 wherein the intermediate region of the silicon body layer comprises a dopant concentration that decreases in value from the contact region of the silicon body layer to the active region of the optical modulating device.

4. A silicon-based optical modulating device as defined in claim 3 wherein the dopant concentration is inversely related to optical mode intensity in the intermediate region of the silicon body layer.

5. A silicon-based optical modulating device as defined in claim 1 wherein the intermediate region of the silicon gate layer comprises an essentially uniform dopant concentration, the essentially uniform dopant concentration being less than the dopant concentration in the contact portion of the silicon gate layer and greater than the dopant concentration in the active region of the optical modulating device.

6. A silicon-based optical modulating device as defined in claim 1 wherein the intermediate region of the silicon gate layer comprises a dopant concentration that decreases in value from the contact region of the silicon gate layer to the active region.

7. A silicon-based optical modulating device as defined in claim 6 wherein the dopant concentration is inversely related to the optical mode intensity in the intermediate region of the silicon gate layer.

8. A silicon-based optical modulating device as defined in claim 1 wherein the intermediate region of the silicon gate layer comprises at least a horizontal portion of the silicon gate layer between the contact portion and the active region.

9. A silicon-based optical modulating device as defined in claim 1 wherein the intermediate region of the silicon gate layer comprises at least an upper portion of the silicon gate layer above the active region.

10. A silicon-based optical modulating device as defined in claim 1 wherein the intermediate region of the silicon body layer comprises at least a horizontal portion of the silicon body layer between the contact portion and the active region.

11. A silicon-based optical modulating device as defined in claim 1 wherein the intermediate region of the silicon body layer comprises at least a lower portion of the silicon body layer below the active region.

\* \* \* \* \*